United States Patent [19]
McDaniels, Jr.

[11] Patent Number: 5,278,879
[45] Date of Patent: Jan. 11, 1994

[54] GRID CRUSHER APPARATUS AND METHOD

[75] Inventor: John D. McDaniels, Jr., Duluth, Ga.

[73] Assignee: Nuclear Assurance Corporation, Norcross, Ga.

[21] Appl. No.: 984,881

[22] Filed: Dec. 2, 1992

Related U.S. Application Data

[63] Continuation-in-part of Ser. No. 831,424, Feb. 5, 1992, Pat. No. 5,194,216, which is a continuation-in-part of Ser. No. 570,812, Aug. 22, 1990, Pat. No. 5,098,644.

[51] Int. Cl.$^5$ .................... G21C 19/00; G21F 9/28
[52] U.S. Cl. .................... 376/260; 100/137; 100/915
[58] Field of Search ............... 376/260, 261; 252/626, 252/633; 100/137, 269

[56] References Cited

U.S. PATENT DOCUMENTS

| | | | |
|---|---|---|---|
| 4,610,199 | 9/1986 | Pols | 100/915 |
| 4,817,521 | 4/1989 | Katada et al. | 252/633 |
| 4,909,141 | 3/1990 | Blenski et al. | 376/260 |

*Primary Examiner*—Daniel D. Wasil
*Attorney, Agent, or Firm*—Hopkins & Thomas

[57] ABSTRACT

A grid crusher apparatus and method are provided for a nuclear fuel rod consolidation system. Spacer grids are crushed within a basket which is then placed in a storage canister. The grid crusher apparatus has a ram assembly and a basket driving mechanism. The ram assembly has a sleeve ram and a central ram. The sleeve ram surrounds the central ram which is longitudinally movable within the sleeve ram. The central ram protrudes from the sleeve ram at a ram contact end and is retractable upon application of a preselected force to the central ram so that the central ram is flush with the sleeve ram at the ram contact end. The basket driving mechanism is configured to move the basket containing a spacer grid towards the ram contact end so that the spacer grid is crushed within the basket. The spacer grid is crushed by the combination of successive forces from the central ram and the sleeve ram, respectively. Essentially, the central portion of the spacer grid is crushed first, and then the remaining outer portion of the spacer grid is crushed to complete the crushing action of the spacer grid. The foregoing process is repeated for other spacer grids until the basket reaches a predetermined allowable capacity, and then the basket is stored in a storage canister.

29 Claims, 8 Drawing Sheets

GRID CRUSHER APPARATUS AND METHOD

This document is a continuation in part of U.S. patent application Ser. No. 07/831,404, entitled "Guide Plate For Locating Rods In An Array" and filed Mar. 20, 1992, now U.S. Pat. No. 5,194,216, which is a continuation in part of patent application Ser. No. 07/570,812, entitled "Apparatus For Consolidation Of Spent Nuclear Fuel Rods" and filed Aug. 22, 1990, now U.S. Pat. No. 5,098,644 to McDaniels. The disclosures of patent application Ser. Nos. 07/570,812 and 07/831,404 are incorporated herein by reference as if set forth in full hereinbelow.

TECHNICAL FIELD

The present invention relates to consolidating spent nuclear fuel rod assemblies, and, more particularly, to a grid crusher apparatus and method for crushing and storing spacer grids from within spent nuclear fuel rod assemblies.

BACKGROUND OF THE INVENTION

Nuclear fuel assemblies for powering nuclear reactors generally consist of large numbers of fuel rods contained in discrete fuel rod assemblies. These assemblies or cells generally consist of a bottom end fitting or nozzle, a plurality of fuel rods extending upwardly therefrom and spaced from each other in a square or triangular pitch configuration, spacer grids situated periodically along the length of the assembly for support and orientation of the fuel rods, often a plurality of control guide tubes interspersed throughout the rod assembly, and a top end fitting or cap. Moreover, the assembly is installed and removed from the reactor as a unit.

When the nuclear fuel rods have expended a large amount of their available energy, the fuel rods are considered to be "spent," and the fuel rod assembly is pulled from the reactor and temporarily stored in an adjacent pool until the assemblies are transported to a reprocessing center or to permanent or temporary storage. Even though the rods are considered "spent," they are still highly radioactive and constitute a very real hazard both to personnel and to property.

In general, there are a number of alternatives available for disposition of the radioactive spent fuel rods, none of which is totally satisfactory. The fuel rod assemblies can be enclosed in a suitable basket and cask arrangement and transported to a storage facility, or possibly, to a reprocessing plant. A second alternative is to store the spent fuel in a dry storage system. Dry storage entails either the use of a large number of metal casks or the building of massive concrete containers either above or below ground, which is a very expensive process, and, where the storage system is above ground, it is often not acceptable to people living or working in its vicinity. A third alternative is the storage of the fuel units in the existing water pool originally designed for temporary storage. This type of storage is the simplest and cheapest, since the fuel rod assemblies can remain in the pool and be left there until the appropriate governmental agency or other agency collects them, often at the end of the life of the nuclear plant. However, such storage pools have a limited capacity, and, where they are adjacent to the nuclear reactor, necessitate the construction of a new pool when one becomes full.

Numerous attempts have been made to increase the capacity of a pool through a process known as fuel rod compaction or consolidation. This process, in brief, comprises removing the fuel rods from each fuel rod assembly and placing them in a storage canister where they are placed in rows with minimal spacing. It is possible, with this process, to place the fuel rods from two or more fuel assemblies into a single storage canister, thereby achieving approximately a 2:1 reduction in required pool volume, or, conversely, a 2:1 increase in pool storage capacity. However, successful consolidation has been an elusive goal for a number of reasons. Inasmuch as the pools are approximately forty feet deep, and inasmuch as the rods must remain immersed in the water at all times, all of the consolidation operations must be performed under the shield and cooling water. In addition, even though the rods are kept under water, the process could be quite hazardous to personnel performing the operation.

Prior art arrangements for achieving rod consolidation have included a system whereby the rods are pulled out row-by-row, as in, for example, a 14×14 matrix of rods, lifted and deposited in a tapered interim storage container, which tapers from a large area top opening to a bottom that has the area of a storage canister. After the intermediate container has the rods from approximately two fuel assemblies deposited therein, the intermediate container is placed over a storage canister, the bottom plate of the tapered container is lowered to cause the rods to slide into the storage canister. If the rods jam or stick, as they often do, they must be pushed from above the pool by operators using long rods. This last operation is made more difficult in that the rods develop on their outside surfaces what is referred to in the trade as "crud". When the fuel rods are pulled, this radioactive crud is scraped off and clouds the water making it difficult for the operators to see what they are doing and contaminating the pool. The method just described has proven to be quite slow and complicated, and can be hazardous to personnel.

Another problem associated with nuclear fuel rod consolidation is the disposal of spacer grids situated in the nuclear fuel rod assemblies for supporting the fuel rods and for maintaining the spacing between the fuel rods. The spacer grids are generally rigid metallic material, and there are usually about seven spacer grids in each rod assembly, or as few as three in gas cooled reactor fuel elements. Conventionally, during the process of fuel rod consolidation, the spacer grids have been crushed by a compactor in the pool, and the crushed remains are then placed in a storage canister. Oftentimes, the compactor has a first ram for crushing the spacer grid in a first direction and a second ram for crushing the spacer grid in a second direction which is orthogonal to the first. As a result, the spacer grids are compacted into a rectangular block which are discarded somewhere in the storage canisters.

However, crushing the spacer grids has been problematic in the art. During the crushing process, the rigid spacer grids break up and/or shatter, resulting in jamming of the compactor rams and creating a contamination problem in the surrounding pool area. Furthermore, the compactor ram surfaces which come in direct contact with the spacer grids during crushing operation become radioactively contaminated and must be disposed of in the storage canisters. Hence, the disposal and consolidation problem is further compounded.

SUMMARY OF THE INVENTION

The present invention is a method and apparatus for efficiently and reliably crushing and storing spacer grids from a nuclear fuel rod assembly during nuclear fuel rod consolidation.

The apparatus and methodology of the present invention may, for example, be primarily used in an automated nuclear fuel rod consolidation system which comprises a commercially available five or six axes robot mounted on the operations floor along the side of the storage pool. Directly below the robot within the pool, at a depth of, for example, twenty-five feet, is an apertured work table, and resting on the floor of the pool directly below the work table is a header and support base, which includes a manifold for a pair of vacuum filter assemblies which are mounted to, and extend upwardly from, the support base. Extending vertically from the support base and into openings in the work table are a plurality of holders configured to support fuel assemblies or fuel rod canisters, which are accessible from above the work table.

A plurality of individual or multiple purpose long reach tools are mounted on racks above and to either side of the work table. Each of the tools has a quick change coupling mounted to its upper end which matches and is adapted to couple with a corresponding quick change coupling on the end of the robot arm.

Locating pins are mounted on the top surface of the work table, and a position sensor carried by one of the long reach tools sends signals to the computer to give precise locations on the work table, thereby enabling the computer to determine the exact location of all components in the system.

In operation, three or four spent fuel rod assemblies are transferred, under water, to the fuel rod assembly holders as dictated by the number of cells provided in the work table for fuel rod assemblies. Empty canisters are transferred to canister holders and their lids are installed in a well located in the work table. The upper end fittings of the fuel rod assemblies are then cut away by a long reach tool having a cutter on its lower end and placed in a scrap canister. Alternatively, the upper end fittings can be unbolted on those fuel assembly types which permit this type of removal.

The computer next directs the robot to couple with a fuel rod transfer tool having a collet for grasping a fuel rod and pulling it out of the rod assembly up into the tool. When this occurs, crud is scraped off of the rod, but, because of the downward water current created by the filter units with their associated pumps, the crud passed down the holder into the manifold and up through the filter, thereby preventing clouding of the water and contamination of the pool.

To ensure that the rod transfer tool centers exactly over a rod to be pulled, an apertured funnel guide plate is placed over the fuel rod assembly, which precisely locates every fourth rod in the assembly. The funnel guide plate is indexed by means of locating pins that fit into holes in the work table or by slots on the underside of the plate that engages the top edges of the canister so that ultimately all of the rods are pulled.

After the canister is completely filled, the skeleton of the fuel rod assembly, comprising guide tubes and spacer grids, is subjected to compaction. The guide tubes are cut above and below the grids, and each tube section is fed into the tube compactor where it is repeatedly cut and flattened into small pieces and then dropped into the scrap canister. Finally, the spacer grids are introduced into the grid crushing apparatus of the present invention, where the spacer grids are crushed in accordance with a novel methodology.

The grid crusher apparatus in accordance with the present invention comprises a ram assembly and a basket driving means. The ram assembly has a sleeve ram and a central ram. The sleeve ram surrounds the central ram and is longitudinally removable within the sleeve ram. The central ram protrudes from the sleeve ram at a ram contact end and is retractable upon application of a preselected force to the central ram. When the central ram is retracted into the sleeve ram, the central ram is flush with the sleeve ram. The basket driving means moves a basket containing a spacer grid towards the ram contact end of the ram assembly. As the basket driving means moves the basket, the spacer grid within the basket is crushed within the basket by the combination of successive forces from the central ram and the sleeve ram, respectively. Essentially, the central ram provides a first ramming force which causes the outer walls of the spacer grid to fold inwardly so that the ram assembly does not get wedged in the basket by the spacer grid which is being crushed, and then a second ramming force to complete the crushing operation.

In accordance with the novel methodology of the present invention, the grid crusher apparatus is operated as follows. A spacer grid is placed in the basket. The basket is then moved toward the ram assembly. Next, the central portion of the spacer grid is depressed during the movement of the basket toward the ram assembly. Finally, the remaining outer portion of the spacer grid is depressed after full depression of the central portion. Many other spacer grids can be crushed in the same manner within the same basket until the basket is full, at which point, the basket is placed in a storage canister.

Other advantages and features of the present invention will be more readily apparent from the following detailed description, when read in conjunction with the accompanying drawings.

DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
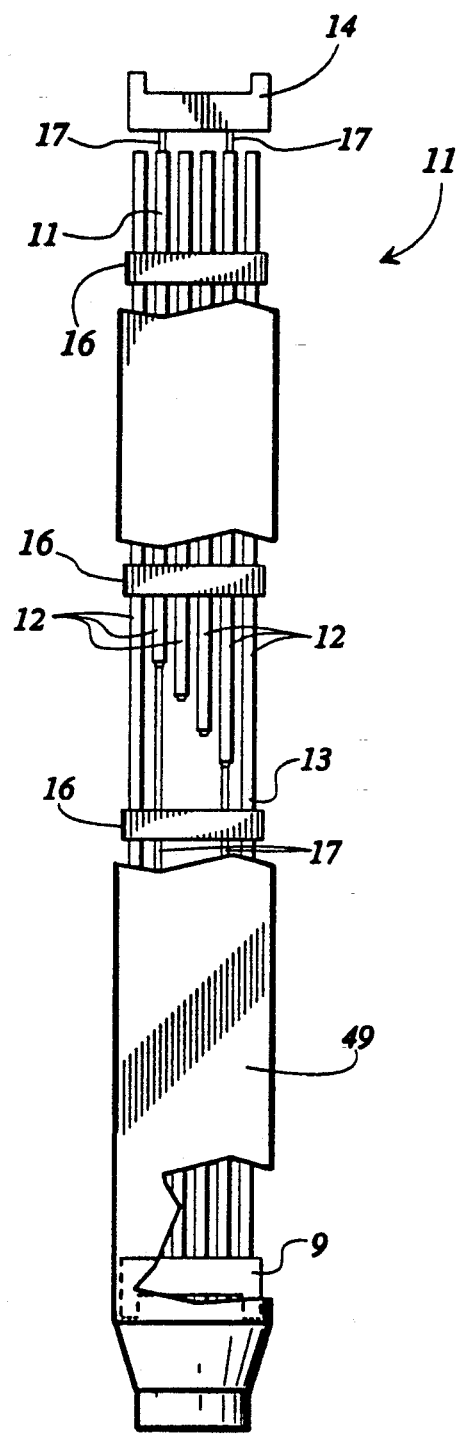
FIG. 1 is an elevation, partially cut-away view of a fuel rod assembly contained in a holder.

In FIG. 1, there is shown a PWR-type fuel rod assembly 11, which comprises a plurality of fuel rods 12 mounted in a holder or skeleton 13 which comprises a top end member 14, a plurality of spacer grids 16, and a plurality of guide tubes 17 which extend along the approximately fourteen foot length of the fuel rod assembly 11. A BWR-type fuel rod assembly is similar to the PWR type, except that the BWR-type has water tubes and a spacer grid support tube in place of the guide tubes 17. The present invention is applicable to both the PWR-type and BWR-type fuel rod assemblies as well as any other fuel rod assembly having spacer grids 16. In essence, the present invention is directed to a novel apparatus and method for disposing of the spacer grids 16.

As further illustrated in FIG. 1, the fuel rod assembly 11 is mounted in a rod assembly or cell holder 49 of generally rectangular cross-section. Member 14 is removed by cutting through the guide tubes 17. This permits removal of the rods from the fuel rod assembly 11. After the fuel rods from two or more fuel assemblies 11 are removed and packed in a fuel rod canister (not shown), various parts of the now empty skeleton, including the spacer grids, must be disposed of by chopping them up, compressing them, and depositing them in scrap canisters.

Figure 2:
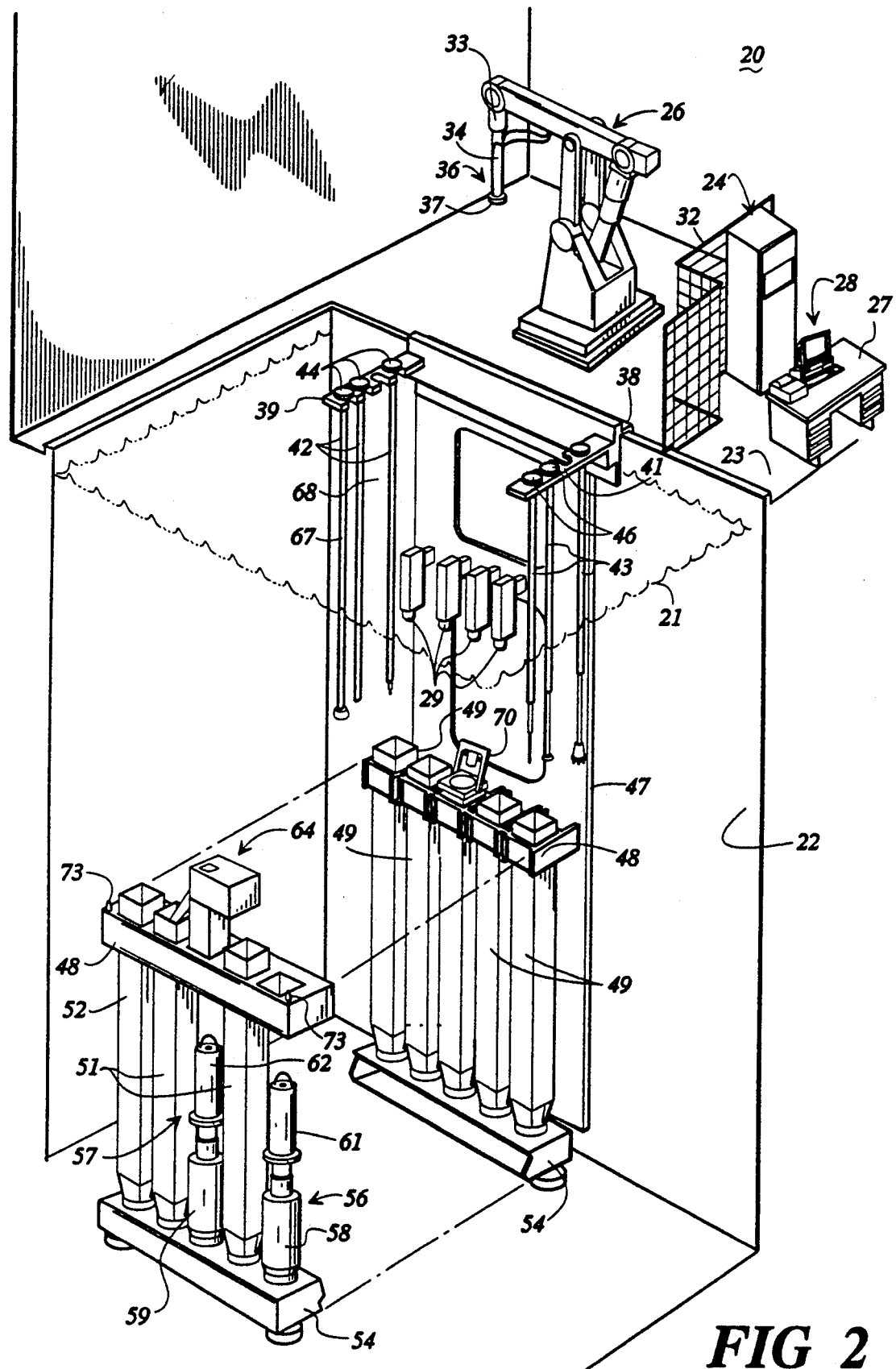
FIG. 2 is a perspective view of a rod consolidation apparatus which utilizes the present invention.

FIG. 2 depicts the various elements of a rod consolidation system 20, a majority of the components of which remain below the water line 21 of the storage pool 22. At the top of the pool is a deck 23 adjacent thereto which has thereon the major control components of the rod consolidation system 20. These components can comprise a computer control cabinet 24 which controls a five or six axes commercially available robot 26 which, in turn, handles the long reach tools 42, 43 for the rod consolidation system 20 and the methods of rod consolidation. Many of the functions of the rod consolidation system 20 are performed by the robot 26 and its associated long reach tools under the control of the computer control cabinet 24. Adjacent to the computer control cabinet 24 is a monitoring station 27 which includes a closed circuit television monitor 28 for monitoring operations by means of a plurality of underwater television cameras 29. A protective wire cage 32 situated on the deck 23 protects both the operator and the equipment from any accidental contact with the robot 26.

Attached to the free or distal end 33 of the arm of robot 26 is a shaft 34 having, at its lower or distal end 36 a quick change coupler 37. Quick change couplers are commercially available items, and any of a number of types of such couplers may be used.

A bracket 38 mounted on a curb at the top of the pool 22 has mounted thereto first and second tool racks 39, 41 for holding a plurality of long reach tools 42, 43, each having at its top end, a quick change coupler 44, 46, respectively, which matches quick change coupler 37. Each of the tools 42, 43 is designed to perform a specific task, and when that task is to be performed, the robot 26 removes that tool 42, 43 from the rack 39, 41 by means of the coupling, causes the tool 42, 43 to perform the task, and returns the tool 42, 43 to the corresponding rack 41. This arrangement has the important advantage of enabling almost all of the steps of the consolidation process to be performed within the pool, without the necessity of active human intervention.

Also mounted to the bracket 38 is a depending frame member 47 to which is mounted a work table 48, shown exploded in FIG. 2. Alternatively, the work table 48 can be supported by a header 54 and joined thereto by an appropriate connecting structure. Work table 48 has mounted in apertures therein four fuel rod assembly holders 49, two scrap canister holders 51, and two fuel rod canister holders 52, 53. Holders 49, 52, and 53 rest in apertures in a support base 54, which also functions as a manifold for a pair of vacuum filter assemblies 56, 57, each comprising a respective pump 58, 59 and a respective filtering element 61, 62. Alternatively, the system can be configured to comprise a pair of filter assemblies 56, 57 with only one pump 58. Also mounted on work table 48 is a guide tube chopper and compactor 64, adjacent a scrap canister holders 51. The compactor 64 has a foldable chute 64 for emptying the compacted trash into its adjacent scrap canister.

Television cameras 29 are mounted to the depending frame member 47 above the table 48. These television cameras are commercially available items having zoom lenses and integral lighting contained in conventional waterproof housings. The television cameras monitor the operation of the system 20, and more particularly, the location of the long reach tools 42, 43 during operation. It is possible, using an appropriate tool calibrator fitted with proximity switches and located at the work table elevation in conjunction with the computer control cabinet 24 and the robot 26, to position the distal or operative end of each tool 42, 43 to within twenty one-thousandths (0.020) of an inch, thereby exceeding any accuracy obtainable when the tools 42, 43 are manipulated by any other means.

Mounted on the table 48 at the corners thereof are locator pins 73. Any of the long reach tools can connect to an electromagnetic locator member. Before operations are begun with a given reach tool, this locator is placed over each of the locator pins 73 in turn and it generates an electrical signal which is transmitted to the computer. The combined inputs of the locating pins 73 enables the computer to determine the precise location of all of the various elements on the work table. Alternatively, the electrical signals may be generated from two fixed locations when any of the distal ends of the reach tools is positioned within the fixed electrical signal devices.

Copending patent application Ser. No. 07/570,812, entitled "Method And Apparatus For Consolidation Of Spent Nuclear Fuel Rods," which is incorporated herein by reference, describes an apparatus and method for removing fuel rods from the four fuel rod assembly holders 49 and placing the fuel rods into the two fuel rod canister holders 52, 53. Furthermore, co-pending patent application Ser. No. 07/831,404, entitled "Guide Plate For Locating Rods In An Array," which is incorporated herein by reference, describes an apparatus and method for precisely locating a rod pulling pole over the fuel rods in the fuel rod assembly 11 and for precisely packing the fuel rods in a fuel rod canister within a fuel rod canister holder 52, 53.

After all the fuel rods have been removed from the fuel rod assemblies 11 within holders 49, a rod assembly skeleton remains in each of the holders 49. The rod assembly skeleton comprises guide tubes 17, spacer grids 16, and lower end fitting 9. The rod assembly skeletons are elevated enough to enable cutters located on the work table to cut the guide tube 17, to cut the spacer grids 16 from the guide tubes 17, and to continue doing so until the rod assembly skeletons are all disassembled. The pieces of the guide tubes 17 are deposited in the compactor 64, where they are repeatedly cut and compacted and then dropped into the adjacent scrap canister 51.

In accordance with the present invention, the spacer grids 16 after being cut from the fuel assembly skeleton are deposited into a novel compactor, or grid crusher apparatus 70, shown in FIGS. 2–8. Preferably, the crusher apparatus 70 is positioned anywhere on the work table 48. While in the grid crusher apparatus 70, the spacer grids 16 are crushed within a rectangular basket and then the basket is placed in a storage canister situated, for example, in canister holder 51. The novel grid crusher apparatus 70 and associated methodology is described in further detail hereafter.

Figure 3:
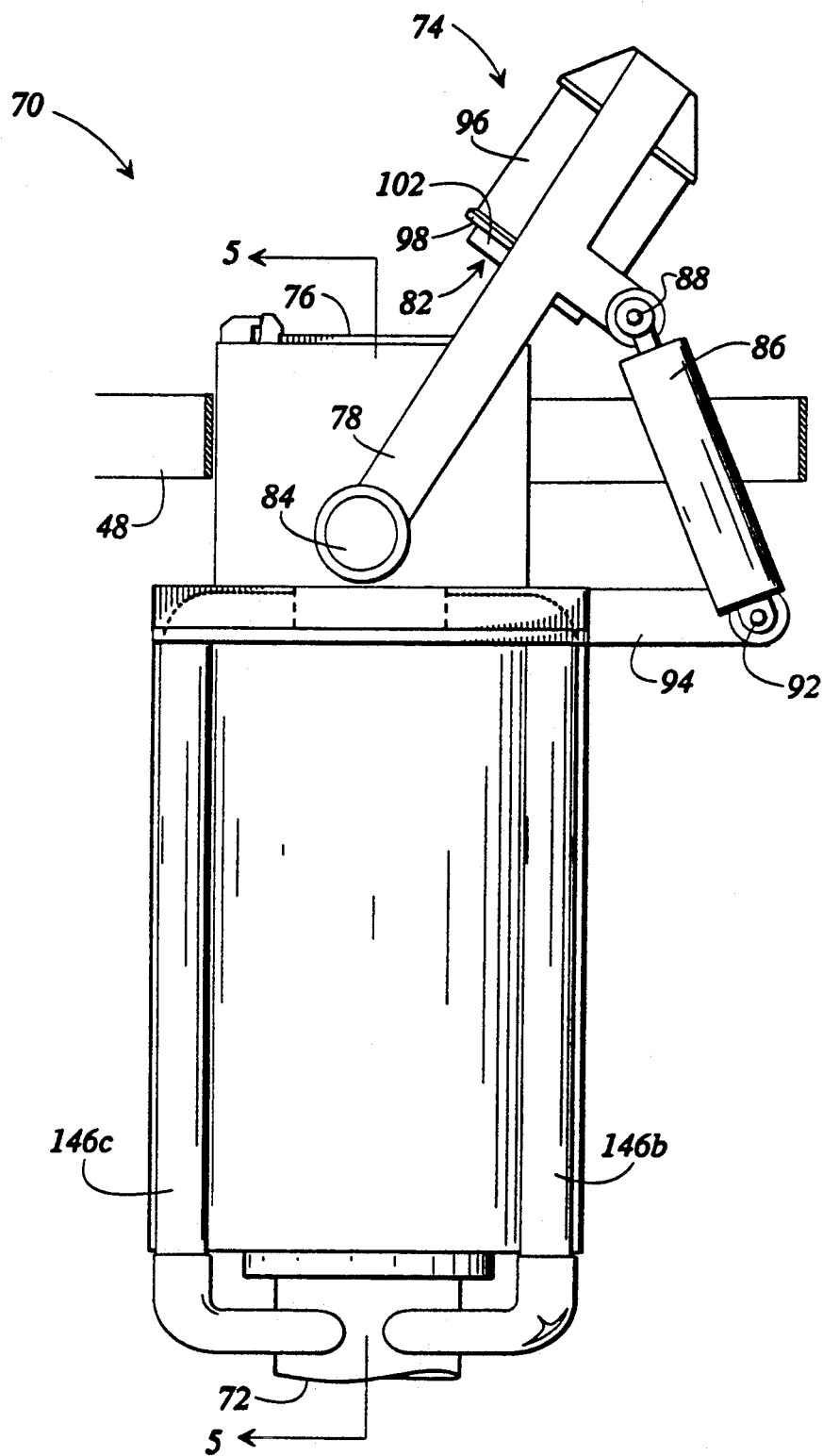
FIG. 3 is a side view of the grid crusher apparatus in accordance with the present invention.

The grid crusher apparatus 70 is supported at its base 72, as shown in FIG. 3. The base 72 is supported vertically by the support base 54 of FIG. 2 and laterally by the work table 48 of FIG. 3. The grid crusher apparatus 70 has a ram assembly 74 which is positioned over a basket 76 by a cylinder 86. A spacer grid 16 (FIG. 4A–4C) is placed in the basket 76. The basket 76 containing the spacer grid 16 is then raised toward the ram assembly 74 so that the spacer grid is crushed within the basket 76. The foregoing process is repeated for each new spacer grid placed within the basket 76. Essentially, the spacer grids 16 are smashed one on top of another within the basket 76. In the preferred embodiment, the spacer grids 16 contained within two entire nuclear fuel rod assemblies, or a total of about 14 to 18 spacer grids depending on the fuel assembly type, are crushed within each basket 76.

The ram assembly 74 has a pivotal yoke 78 adapted to move a ram contact end 82 in line with the upward movement of the basket 76. The pivotal yoke 78 pivots about an axis 84 and is forced to move via a cylinder 86, which is a hydraulic cylinder in the preferred embodiment. The cylinder 86 is connected to the yoke 78 at a pivotal joint 88 and is connected to the grid crusher apparatus 70 via a pivotal joint 92 and a transverse support member 94. It should be noted that the yoke 78 could be moved via many conventional means, such as a motor driven apparatus or a hydraulic cylinder in other configurations.

Figure 4A:
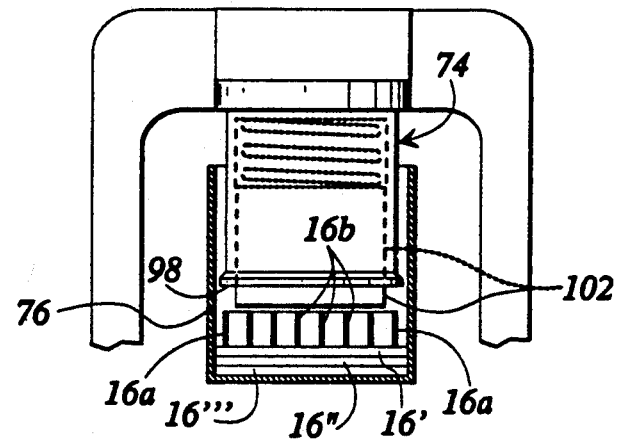
FIGS. 4A, 4B, and 4C are cut-away side views showing the operation of a ram assembly of the grid crusher apparatus in accordance with the present invention.
Figure 4B:
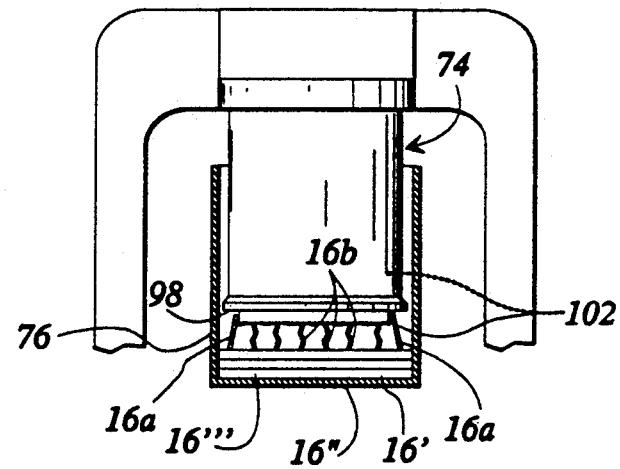
Figure 4C:
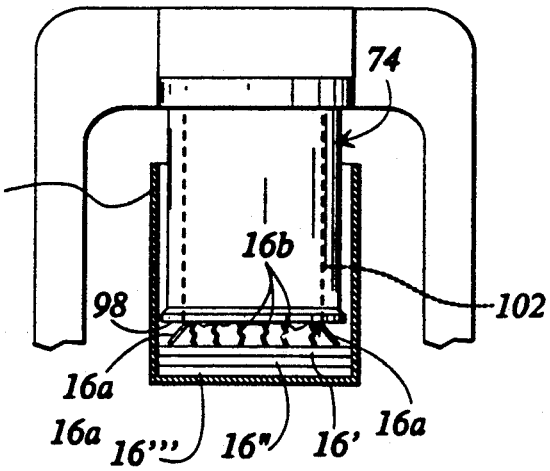

In accordance with a significant feature of the present invention, the ram assembly 74 has an outer substantially rectangular sleeve ram 96 with a sleeve ram contact end 98 and a central ram 102 longitudinally movable within the sleeve ram 96. The operation of the outer substantially rectangular sleeve ram 96 and central ram 102 is described hereafter relative to FIGS. 4A through 4C. At the initial stages of the crushing action, the central ram 102 fully protrudes from the sleeve ram 102, as shown in FIG. 4A. However, as a crushing action commences and the inner walls or straps 16b of the spacer grid 16 are contacted by the central ram 102, the central ram 102 retracts into the sleeve ram 96 via application of a preselected force to the central ram 102 at the ram contact end 82, as illustrated in FIG. 4B. The central ram 102 moves until the central ram 102 is flush with the contacting end 98 of the sleeve ram 96, as shown in FIG. 4C. At this point, both the sleeve ram 96 and the central ram 102 contact and concurrently crush the spacer grid 16 so as to complete the crushing action. Reference numerals 16''', 16'', 16' represent those spacer grids which have been previously crushed, in succession respectively, in the base of the basket 76. The foregoing operation of the ram assembly 74 causes the outer walls or straps 16a of the spacer grid to fold, or angle, inwardly, as shown in FIG. 4B, during the crushing action to prevent the outer straps 16a from becoming wedged between the basket 76 and sleeve ram 96 of FIG. 3.

An important feature of the present invention is that the basket 76 provides an adequate container for the grids 16 whether the grids 16 collapse in a ductile manner or shatter due to the effect of radiation hardening. This is important because shattering can discharge debris which can cause jamming of equipment, undesirably disperse debris, or generate other undesirable consequences.

Another significant feature of the present invention is the minimization of ram crushing surfaces. Experience has shown that when high intensity forces are used to crush metal items, portions of the metal items are "smeared" into the crushing surfaces, resulting in a metal build-up. In the present invention, there is only one ram end which contacts the spacer grids 16. Only the basket 76 contacts the sides and bottom of the spacer grids during crushing action. Hence, the only build-up of metal occurs at the ram contact end 82 of the sleeve ram and central ram. It should be noted that the foregoing ram contact end surfaces may be provided with a removable face plate which can be readily dropped or otherwise disposed of while the grid crusher apparatus is still under water, i.e., before removing the grid crusher apparatus 70 from the pool.

Figure 5:
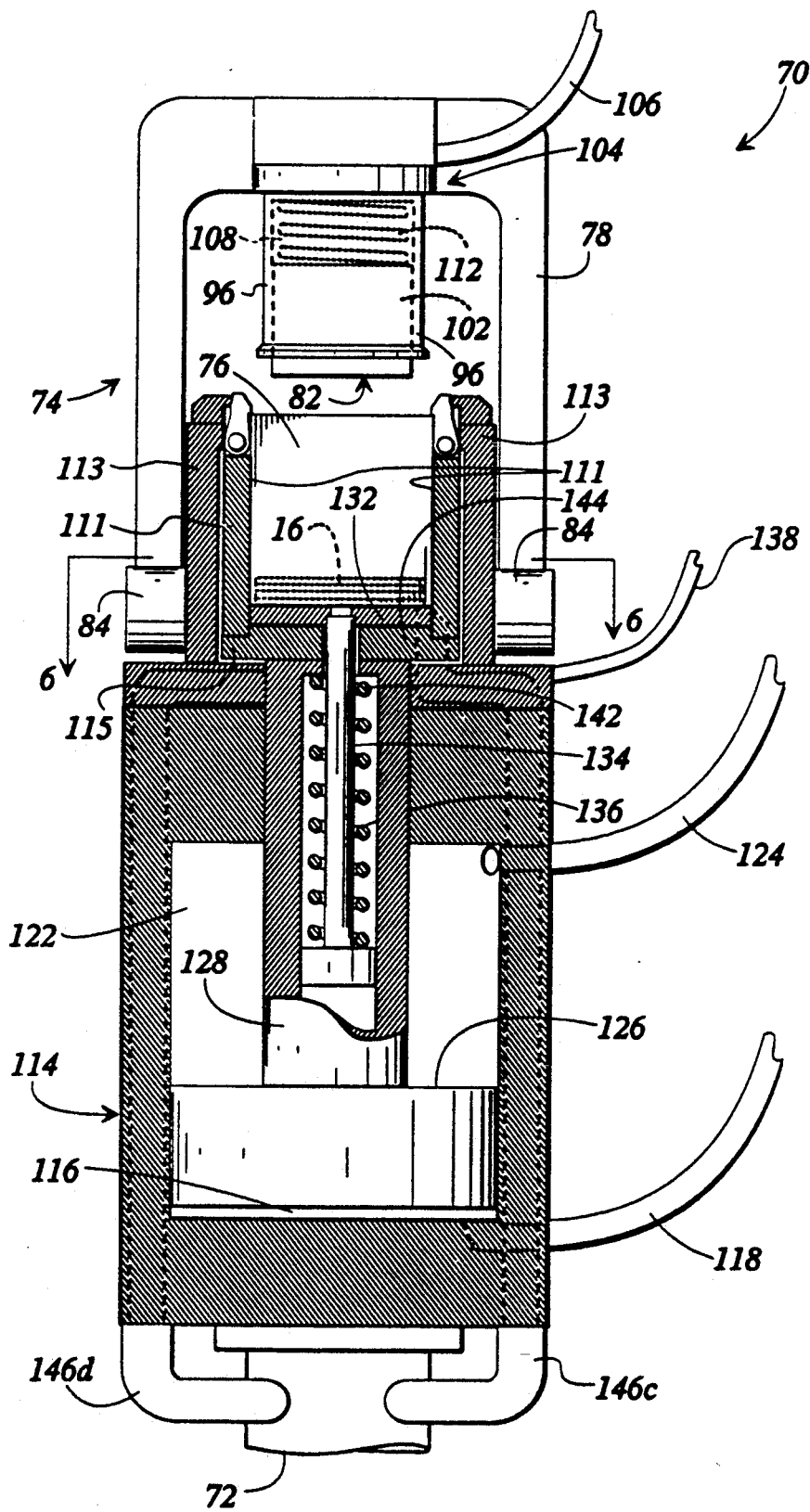
FIG. 5 is an elevation, partially cut-away view of the grid crusher apparatus of FIG. 3 taken along line 4'—4'.

In the preferred embodiment, a hydraulic means 104 impedes the movement of the central ram 102, and thus, defines the preselected force necessary to move the central ram 102 flush with the contacting end 98 of the sleeve ram 96. A ram assembly hydraulic line 106 is disposed, as shown in FIG. 5, to provide hydraulic fluid to a hydraulic cylinder (not shown) located within the confines of the inner ram chamber 108 defined by the inner walls of the sleeve ram 96 and central ram 102. In the alternative, as indicated in FIG. 5 by phantom lines, a spring 112 may be situated in the chamber 108 so as to exert force against the central ram 102 and impede movement of the central ram 102 inwardly.

For moving the basket 76 in an upward manner towards the ram assembly 74, the grid crusher apparatus 70 can be provided with any conventional basket driving means. In the preferred embodiment, a movable box-like compartment for holding and moving the basket 76 upwardly is defined by lateral walls 111 and a basket base plate 132. The wall 111 are strong enough to support and maintain the thin walls of the basket 76 as spacer grids 16 are crushed therein. The compartment is movable within a housing defined by walls 113, which remains fixed relative to the yoke 78.

Preferably, the basket driving means has a hydraulic cylinder 114 disposed beneath the basket 76. In the preferred embodiment, the basket driving means provides about 60 to 80 tons of force for spacer grids 16 from a BWR-type fuel rod assembly and about 250 to 300 tons of force for spacer grids from a PWR-type fuel rod assembly. The hydraulic cylinder 114 comprises a ram chamber 116, which is fed hydraulic fluid by a ram hydraulic line 118 so as to effectuate movement of the basket 76 upwardly towards the ram assembly 74. The hydraulic cylinder 114 further comprises a return chamber 122 adapted to receive hydraulic fluid from a return hydraulic line 124 so as to effectuate movement of the basket 76 downwardly away from the ram assembly 74. The ram chamber 116 and the return chamber 122 are defined and divided by an inner piston 126. It should be noted that the basket driving means could take the form of a pneumatic structure, ball/roller screw-driven apparatus, or other conventional configuration having similar functionality.

The grid crusher apparatus 70 further includes an ejection cylinder 128, which also serves as the piston rod for crushing grids. The ejection cylinder 128 contains a piston rod 134 which is configured to eject the basket 76 from the grid crusher apparatus via upward movement of a basket ejection plate 132. As indicated in FIG. 5, the basket ejection cylinder 128 is disposed to move longitudinally within the ram cylinder 114. The basket ejection cylinder 128 preferably comprises a hydraulic driving means for driving a piston rod 134 connected to the basket ejection plate 132. Hydraulic fluid is fed to an ejection chamber 136 via an ejection hydraulic line 138. Moreover, the basket ejection plate 132 is returned by mechanical spring force applied via a spring 142, the cross section of which is illustrated in FIG. 5. Obviously, the spring 142 and/or the hydraulic means associated with the basket ejection cylinder 128 could be replaced by comparable conventional means, including pneumatic, hydraulic, or ball/roller screw-driven apparatuses.

Figure 6:
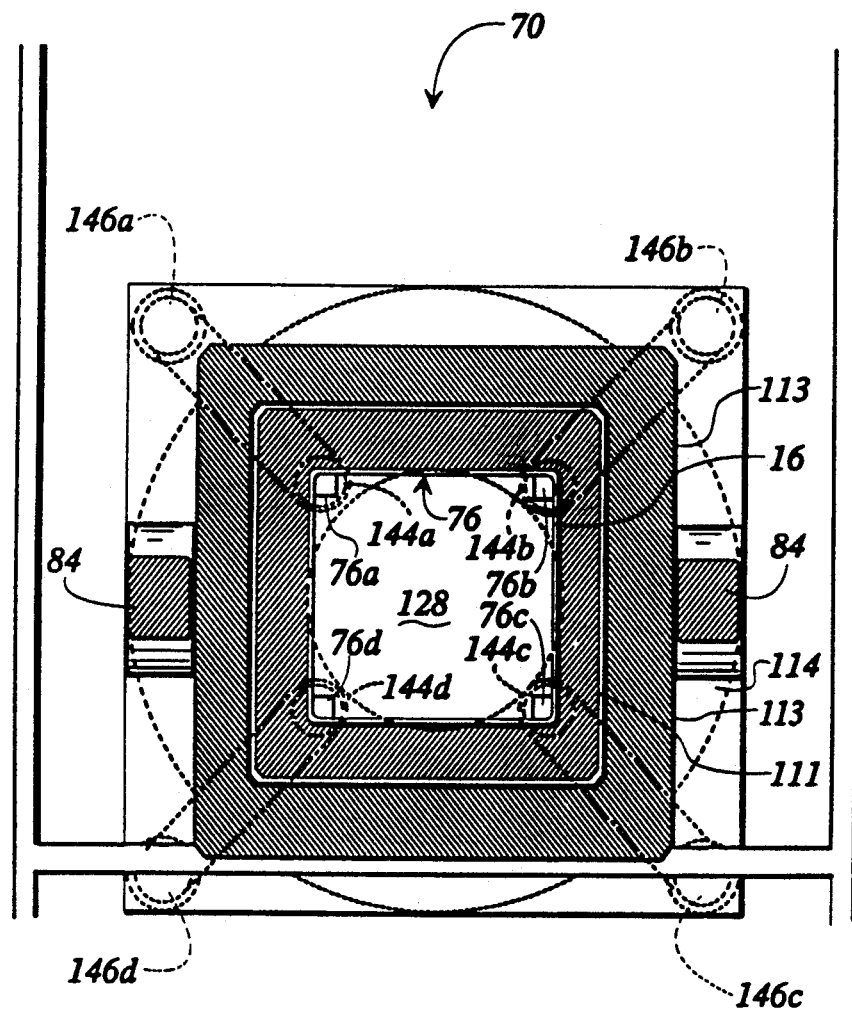
FIG. 6 is a top partially cut-away view of the grid crusher apparatus of FIG. 3 taken along line 5'—5'.

During a crushing action when the basket 76 moves upwardly towards the ram assembly 74, water is suctioned from the interior of the basket 76 in order to prevent contamination of the pool by crud or debris generated by the crushing action. For the foregoing purpose, the basket 76 is provided with apertures 76a-76d at its corners, through which debris is suctioned. Apertures 76a-76d are aligned with corner notches in basket ejection plate 132. In addition, the basket support assembly 144 also contains apertures 144a-144d. The apertures 144a-144d are best illustrated in FIG. 6. As further shown in FIG. 6, the flow through the apertures 144a-144d empties into the chamber below apertures 144a-144d and surrounded by the housing walls 113. This chamber is connected to respective outer pipes 146a-146d. The pipes 146a-146d run longitudinally down the periphery of the grid crusher apparatus 70 to the hollow base 72 which is connected to the support header 54. Reduced pressure is maintained in the pipes 146a-146d so as to pull debris from the interior of the basket 76.

Figure 7:
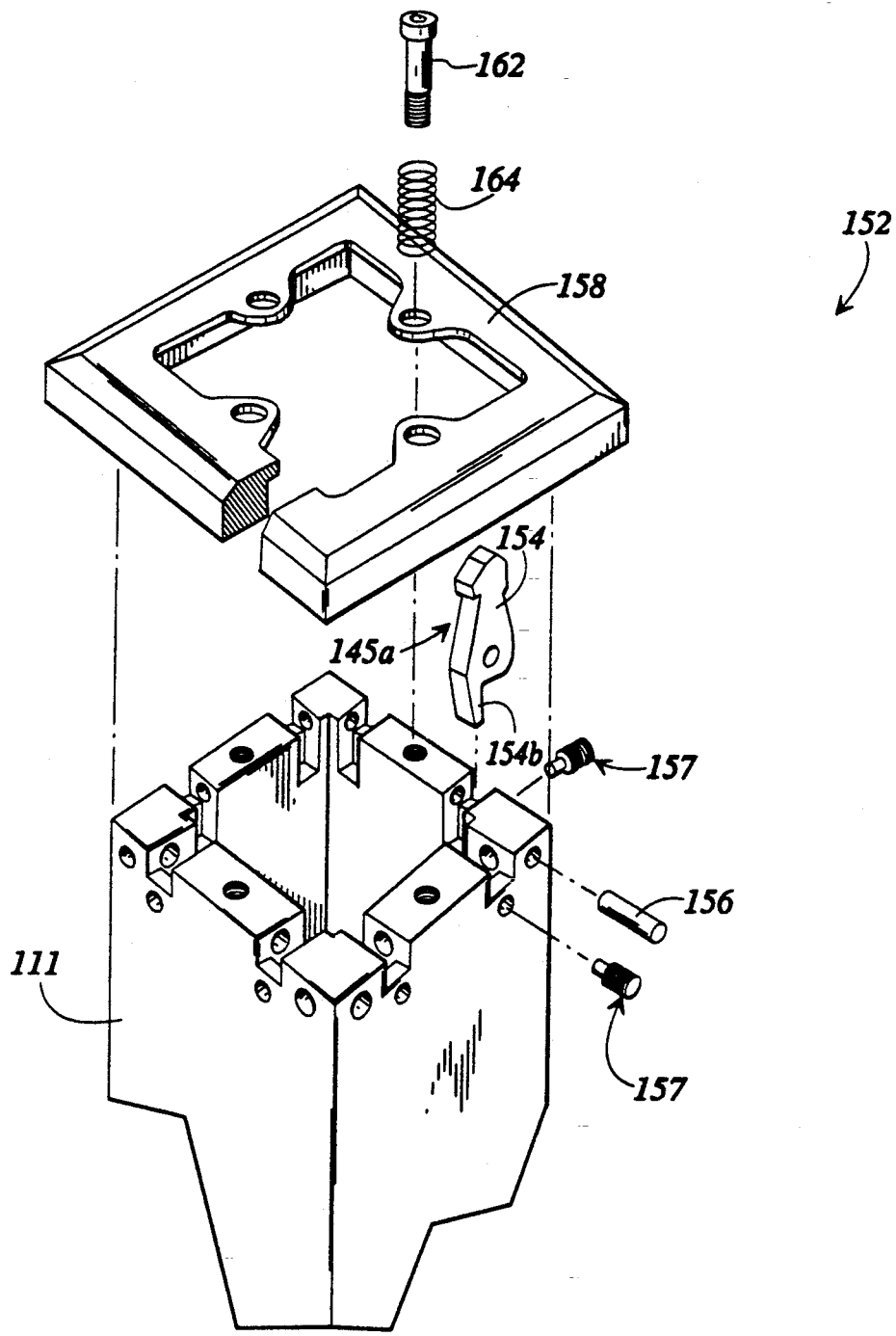
FIG. 7 is a perspective view of a basket gripper mechanism for the grid crusher apparatus of FIG. 3.
Figure 8A:
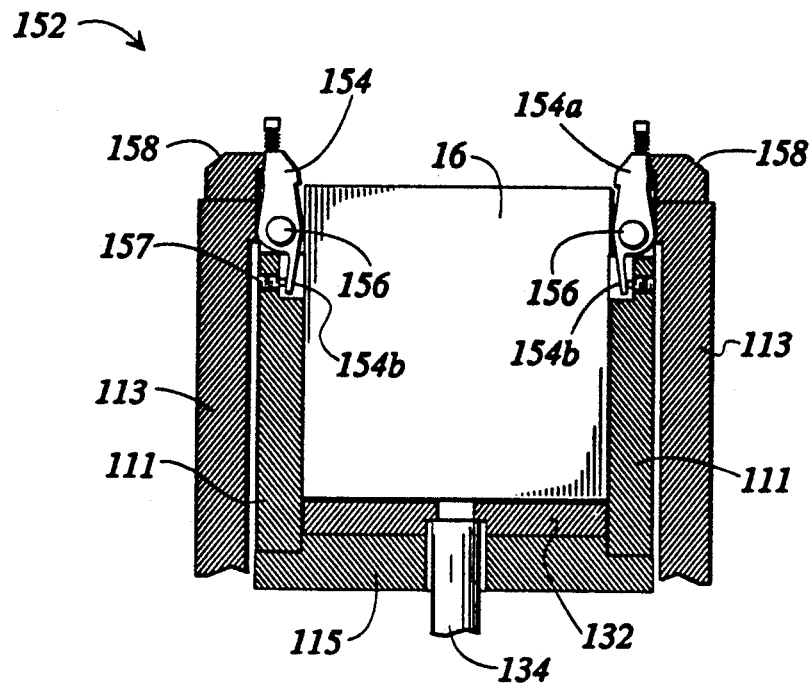
FIGS. 8A and 8B are cut-away side views of the grid crusher apparatus of FIG. 3 showing the operation of the basket gripper mechanism of FIG. 7.
Figure 8B:
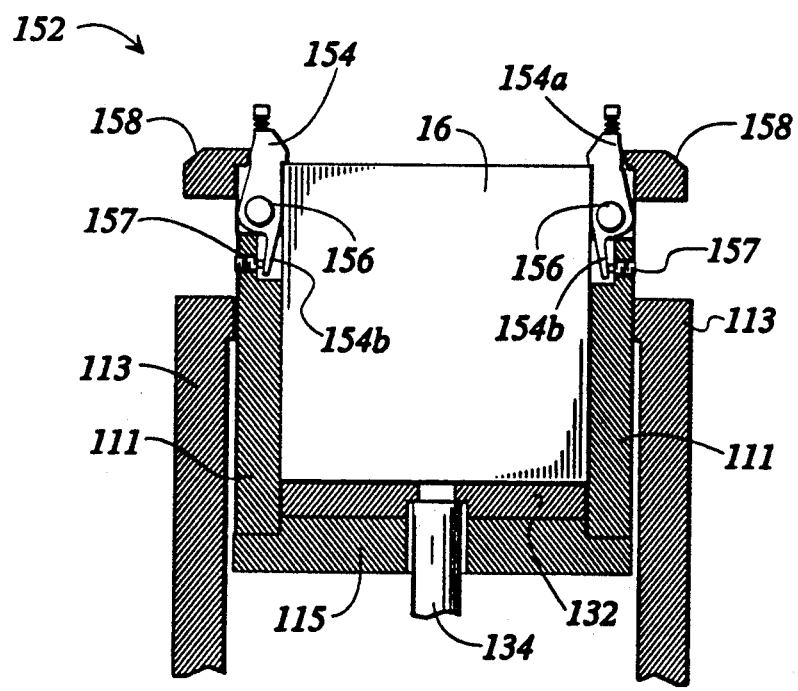

To facilitate crushing action within the basket 76, the grid crusher apparatus 70 is provided with a basket gripper mechanism 152 disposed to grip the top edges of the basket 76. The assembly of the basket gripper mechanism 152 is shown in FIG. 7, and its operation is illustrated in FIGS. 8A and 8B. As shown in FIG. 7, the gripper mechanism 152 comprises a plurality of grippers 154 disposed around the upper periphery of the movable box-like compartment defined by walls 111 and a periphery ring 158. There are preferably two grippers 154 per each wall 111 and consequently a total of eight grippers 154. Each gripper 154 has a gripping end 154a for engaging the basket 76 and a lever end 154b, and each gripper 154 pivots about a respective axis rivet 156. Moreover, the gripping ends 154a of each gripper 154 are normally forced outwardly by spring plungers 157, or other comparable means, situated to impose an inward force on the respective lever ends 154b.

In operation, when the basket 76 is positioned away from the ram assembly 74 in its start position, as illustrated in FIG. 8A, the gripping ends 154a of the plurality of grippers 154 are forced outwardly by the spring plungers 157. This permits obstruction-free ingress and egress of the basket 76 into and out of the movable box-like compartment defined by walls 111 of the grid crusher apparatus 70.

When the grid crusher apparatus 70 moves the basket 76 upwardly towards the ram assembly 74, as illustrated in FIG. 8B, the periphery ring 158 is carried upwardly along with the basket 76. The periphery ring 158 is forced downwardly about and guided by pins 162 via force from respective springs 164. As a consequence, the periphery ring 158 forces the gripping ends 154a of grippers 154 inwardly so that the gripping ends 154a engage the top of the basket 76, notwithstanding the spring force from spring plungers 157 attempting to force the gripping ends 154a outwardly. In this manner, the basket 76 is gripped by the gripping mechanism 152. Because of the gripping action exercised by the gripping mechanism 152, the basket 76 can be easily pulled down from the ram assembly 74 after a crushing action without adverse disengagement of the basket 76 from the grid crusher apparatus 70.

It will be apparent to those skilled in the art that numerous modifications may be made to the preferred embodiment without departing from the principles of the present invention. All such modifications are intended to be incorporated within the scope of the present invention.

What is claimed is:

1. A grid crusher apparatus for crushing spacer grids from a nuclear fuel rod assembly during nuclear fuel rod consolidation, comprising:

a ram assembly having a sleeve ram and a central ram disposed at a ram contact end, said sleeve ram surrounding said central ram and said central ram being longitudinally movable within said sleeve ram, said central ram protrudable from said sleeve ram at said ram contact end and retractable upon application of a preselected force to said central ram so that said central ram is flush with said sleeve ram; and basket driving means for receiving a basket containing a spacer grid, said basket driving means for moving said basket when said basket is associated with said basket driving means towards said ram contact end so that said spacer grid is crushed within said basket by the combination of said central ram and said sleeve ram.

2. The apparatus of claim 1, further comprising hydraulic means for impeding the movement of said central ram and for defining said preselected force.

3. The apparatus of claim 1, further comprising a spring means for impeding the movement of said central ram and for defining said preselected force.

4. The apparatus of claim 1, wherein said basket driving means further comprises an aperture situated where said basket is received, and further comprising a vacuum means for suctioning debris through said aperture as said spacer grid is crushed.

5. The apparatus of claim 1, wherein said ram assembly further comprises a pivotal yoke adapted to move said ram assembly in line with the movement of said basket.

6. The apparatus of claim 1, wherein said basket driving means further comprises a hydraulic cylinder configured to move said basket toward said ram contact end.

7. The apparatus of claim 1, further comprising an ejection means for disengaging said basket from said driving means.

8. The apparatus of claim 6, further comprising a gripper means for gripping a top edge of said basket during movement.

9. A method for crushing spacer grids from a nuclear fuel rod assembly during nuclear fuel rod consolidation, comprising the steps of:
moving a basket containing a spacer grid;
depressing the central portion of said spacer grid during movement of said baskets; and
depressing the remaining outer portion of said spacer grid after said depressing of said central portion.

10. The method of claim 9, further comprising the steps of:
disposing a ram assembly having a cylindrical sleeve ram;
providing a central ram longitudinally movable within said sleeve ram so that said central ram is protrudable from said sleeve ram at a ram contact end and is retractable to a position where said central ram is flush with said sleeve ram at said ram contact end; and
crushing a spacer grid within a basket by moving said basket towards said ram contact end so that said spacer grid contacts successively said central ram and then said sleeve ram.

11. The method of claim 10, further comprising the steps of:
initiating said crushing of said spacer grid by imposing said central ram against said spacer grid;
retracting said central ram to said position flush with said sleeve ram; and
concluding said crushing by imposing said sleeve ram against said spacer grid.

12. A system for crushing spacer grids from a nuclear fuel rod assembly during nuclear fuel rod consolidation, comprising:
basket driving means for moving a basket containing a spacer grid upon associating said basket with said basket driving means;
first ram means for depressing a central portion of said spacer grid during movement by said basket driving means, thereby causing outer walls of said spacer grid to angle inwardly;
second ram means for depressing a remaining outer portion of said spacer grid after said depressing by said first ram means of said central portions;
said first ram means comprising a central ram longitudinally movable within a sleeve ram constituting said second ram means, said central ram protrudable from said sleeve ram at a ram contact end and retractable upon application of a preselected force to said central ram so that said central ram is flush with said sleeve ram at said ram contact end; and
a pivotal yoke adapted to move said sleeve ram in line with the movement of said basket.

13. The system of claim 12, wherein said basket driving means further comprises an aperture situated where said basket is associated with said driving means, and further comprising a vacuum means for suctioning debris through said aperture as said spacer grid is crushed.

14. The system of claim 12, wherein said basket driving means further comprises a hydraulic cylinder configured to move said basket towards said first and second ram means.

15. The system of claim 12, further comprising an ejection means for disengaging said basket from said basket driving means.

16. The system of claim 12, further comprising a gripper means for gripping a top edge of said basket during movement.

17. The system of claim 12, further comprising a hydraulic means for impeding the movement of said central ram and for defining said preselected force.

18. The system of claim 12, further comprising a spring means for impeding the movement of said central ram and for defining said preselected force.

19. A system for crushing spacer grids from a nuclear fuel rod assembly during nuclear fuel rod consolidation, comprising:
basket driving means for moving a basket containing a spacer grid upon associating said basket with said basket driving means;
first ram means for depressing a central portion of said spacer grid during movement by said basket driving means, thereby causing outer walls of said spacer grid to angle inwardly;
second ram means for depressing a remaining outer portion of said spacer grid after said depressing by said first ram means of said central portions;
said first ram means comprising a central ram longitudinally movable within a sleeve ram constituting said second ram means, said central ram portrudable from said sleeve ram at a ram contact end and retractable upon application of a preselected force to said central ram so that said central ram is flush with said sleeve ram at said ram contact end; and
a hydraulic means for impeding the movement of said central ram and for defining said preselected force.

20. The system of claim 19, wherein said basket driving means further comprises an aperture situated where said basket is associated with said driving means, and further comprising a vacuum means for suctioning debris through said aperture as said spacer grid is crushed.

21. The system of claim 19, wherein said basket driving means further comprises a hydraulic cylinder configured to move said basket towards said first and second ram means.

22. The system of claim 19, further comprising an ejection means for disengaging said basket from said basket driving means.

23. The system of claim 19, further comprising a gripper means for gripping a top edge of said basket during movement.

24. The system of claim 19, further comprising a spring means for impeding the movement of said central ram and for defining said preselected force.

25. A system for crushing spacer grids from a nuclear fuel rod assembly during nuclear fuel rod consolidation, comprising:
basket driving means for moving a basket containing a spacer grid upon associating said basket with said basket driving means;
first ram means for depressing a central portion of said spacer grid during movement by said basket driving means, thereby causing outer walls of said spacer grid to angle inwardly;
second ram means for depressing a remaining outer portion of said spacer grid after said depressing by said first ram means of said central portions;

said first ram means comprising a central ram longitudinally movable within a sleeve ram constituting said second ram means, said central ram protrudable from said sleeve ram at a ram contact end and retractable upon application of a preselected force to said central ram so that said central ram is flush with said sleeve ram at said ram contact end; and a spring means for impeding the movement of said central ram and for defining said preselected force.

26. The system of claim 25, wherein said basket driving means further comprises an aperture situated where said basket is associated with said driving means, and further comprising a vacuum means for suctioning debris through said aperture as said spacer grid is crushed.

27. The system of claim 25, wherein said basket driving means further comprises a hydraulic cylinder configured to move said basket towards said first and second ram means.

28. The system of claim 25, further comprising an ejection means for disengaging said basket from said basket driving means.

29. The system of claim 25, further comprising a gripper means for gripping a top edge of said basket during movement.

* * * * *